United States Patent
Le

(10) Patent No.: US 11,520,989 B1
(45) Date of Patent: Dec. 6, 2022

(54) NATURAL LANGUAGE PROCESSING WITH KEYWORDS

(71) Applicant: Workday, Inc., Pleasanton, CA (US)

(72) Inventor: Vu Le, Danville, CA (US)

(73) Assignee: Workday, Inc., Pleasanton, CA (US)

( * ) Notice: Subject to any disclaimer, the term of this patent is extended or adjusted under 35 U.S.C. 154(b) by 235 days.

(21) Appl. No.: 16/407,890

(22) Filed: May 9, 2019

Related U.S. Application Data

(60) Provisional application No. 62/672,904, filed on May 17, 2018.

(51) Int. Cl.
*G06F 40/30* (2020.01)
*G06F 40/205* (2020.01)

(52) U.S. Cl.
CPC .......... *G06F 40/30* (2020.01); *G06F 40/205* (2020.01)

(58) Field of Classification Search
CPC ........ G06F 40/30; G06F 40/205; G06F 40/20; G10L 15/22
See application file for complete search history.

(56) References Cited

U.S. PATENT DOCUMENTS

| | | | | |
|---|---|---|---|---|
| 9,070,366 | B1* | 6/2015 | Mathias | G10L 15/26 |
| 9,424,233 | B2* | 8/2016 | Barve | G06F 16/2457 |
| 9,911,413 | B1* | 3/2018 | Kumar | G10L 15/16 |
| 10,572,592 | B2* | 2/2020 | Hoffenberg | G06F 40/58 |
| 2014/0108006 | A1* | 4/2014 | Vogel | G06F 40/40 704/9 |
| 2015/0149177 | A1* | 5/2015 | Kains | G10L 15/1822 704/257 |
| 2015/0302850 | A1* | 10/2015 | Lebrun | G06F 40/35 704/243 |
| 2016/0260029 | A1* | 9/2016 | Gelfenbeyn | G06F 40/30 |
| 2017/0116982 | A1* | 4/2017 | Gelfenbeyn | G10L 15/22 |
| 2017/0132019 | A1* | 5/2017 | Karashchuk | H04W 4/12 |
| 2017/0278514 | A1* | 9/2017 | Mathias | G10L 15/22 |
| 2018/0336268 | A1* | 11/2018 | Xu | G06F 40/295 |
| 2019/0019160 | A1* | 1/2019 | Champaneria | G06F 16/951 |
| 2019/0259380 | A1* | 8/2019 | Biyani | G10L 15/22 |
| 2019/0306107 | A1* | 10/2019 | Galbraith | G06F 40/30 |
| 2019/0361671 | A1* | 11/2019 | Maltsev | B60K 35/00 |

FOREIGN PATENT DOCUMENTS

CN 107430517 A * 12/2017 .......... H04M 3/4217

* cited by examiner

*Primary Examiner* — Daniel C Washburn
*Assistant Examiner* — Athar N Pasha
(74) *Attorney, Agent, or Firm* — Van Pelt, Yi & James LLP

(57) ABSTRACT

The system for responding to a set of words includes an interface and a processor. The interface is configured to receive the set of words. The processor is configured to determine a token from the set of words; determine an entity and an associated keyword from the token, wherein the entity is associated with an entity type; determine an intent based at least in part on the set of words; match the entity to an entity of the intent based on the associated keyword; and determine a response based on the intent and the entity.

26 Claims, 10 Drawing Sheets

Intent Definition

Intent Name

Find Documents

Intent Inputs

| NAME | ENTITY TYPE | KEYWORDS |
|---|---|---|
| creator | PERSON | created by, started by, author |
| updater | PERSON | updated by, last changed by |
| modified date | DATE | updated, modified |

Fig. 3

NATURAL LANGUAGE PROCESSING WITH KEYWORDS

CROSS REFERENCE TO OTHER APPLICATIONS

This application claims priority to U.S. Provisional Patent Application No. 62/672,904 entitled METHODS AND SYSTEMS TO FACILITATE FILTERING DATA SETS AND RESOLVING AMBIGUITY USING NATURAL LANGUAGE filed May 17, 2018 which is incorporated herein by reference for all purposes

BACKGROUND OF THE INVENTION

A natural language processing system receives a text string and determines an action to take in response based on the meaning of the text. Natural language processing systems are typically designed to handle simple phrases including a single clause, and are unable to determine a meaning for compound phrases. This creates a problem when it is desired to access complex database queries or other system commands via natural language phrases.

BRIEF DESCRIPTION OF THE DRAWINGS

Various embodiments of the invention are disclosed in the following detailed description and the accompanying drawings.

FIG. 3 is a diagram illustrating an embodiment of a user interface for creating an intent definition.

DETAILED DESCRIPTION

Figure 1:
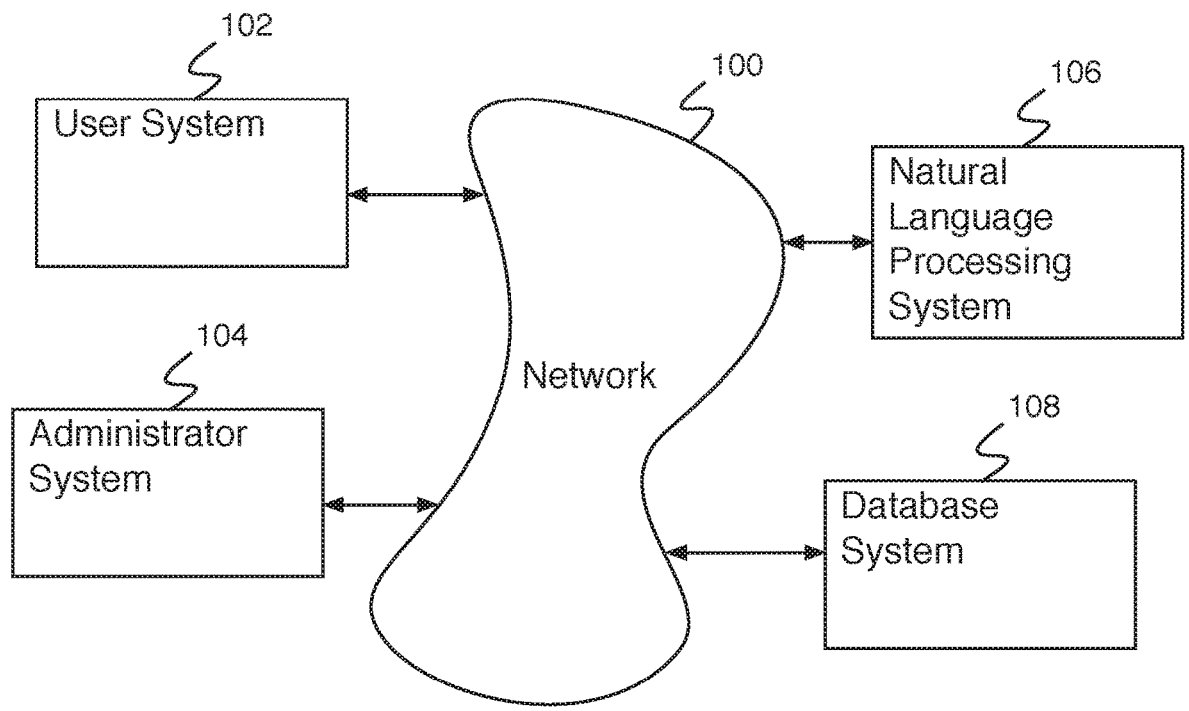
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for responding to a set of words comprises an interface configured to receive the set of words, and a processor configured to determine a token from the set of words, determine an entity and an associated keyword from the token, wherein the entity is associated with an entity type, determine an intent based at least in part on the set of words, match the entity to an entity of the intent based on the associated keyword, and determine a response based on the intent and the entity.

A system for responding to a set of words comprises a system for determining a response (e.g., an action to take) based on the set of words. The system for responding to a set of words is capable of dealing with compound statements comprising multiple keywords. A keyword comprises a word of the set of words indicating a contextual meaning associated with an entity. An entity comprises a proper noun or other concrete descriptor (e.g., a time, a date, an address, an organization, etc.). In a simple phrase comprising a single entity, or multiple entities that are distinctive from one another (e.g. person, location, time, etc.), the entity(s) can be extracted and an intent can be determined based on the entity type(s) and the keyword. In the event multiple intents are associated with the entity type and the keyword, a most likely intent can be determined using a model (e.g., a machine learning model, a neural network model). An intent comprises an identifiable pattern associated with an action. For example, the phrase "Find documents created by Peter" includes entity "Peter" of type Person associated with keyword "created by". A model determines that this has a "find documents" intent, and that the associated query parameters are "created by" and "Peter". From this information the model is able to construct a database query corresponding to the phrase.

The above describes the importance of keywords for multiple entities. However for sentences that comprise of only 1 entity, or multiple entities that are distinctive (e.g., PERSON and DATE), it's easy to extract them using existing methods. For these simple sentences, keywords improve the accuracy of detecting the intent as the system pairs likely keywords with entities that are likely to be used by users, hence improving the accuracy. The keywords are definitely beneficial when there are multiple entities that are similar— for example, in a phrase such as "created by Peter and written by Paul," where two PERSON entities are required. Without keywords, the system would not be able to identify the two entities or the appropriate intent.

In a compound phrase comprising multiple entities and keywords, associating entities with keywords (e.g., to establish the function of an entity in the phrase) is more challenging. For example, in the phrase "Find documents created by Peter and updated by Paul", the entity "Peter" should be associated with the keyword "created by" and the entity "Paul" should be associated with the keyword "updated by". Correctly making these associations requires a further level of analysis. This analysis is accomplished by first parsing the compound phrase into a set of tokens using separators. Separators comprise words or punctuation typically used to separate parts of a sentence. For example, separators in the English language comprise "and", "or", "but", ",", ";"; etc. As another example, separators in the French language comprise "et", "ou", "mais", ",", etc. In various embodiments, separators are defined for any other language (e.g., Spanish, Mandarin, Japanese, etc.) or combination of languages. In some embodiments, the intents and entities are correspondingly defined or paired in another appropriate language or combination of languages. The set of words is searched for separators, and tokens (e.g., each token comprising a subset of the set of words) separated by the separators are identified. Tokens are analyzed for entities and keywords. In the event a token comprises a single entity and a single keyword, the keyword and entity are associated. For example, the phrase "Find documents created by Peter and updated by Paul" is split into two tokens, "Find documents created by Peter" and "updated by Paul". This allows the entities and keywords to be associated correctly. In the case where multiple entities and keywords are expected and found, but without any separators, then the system can associate an entity to keyword by how far each entity is from a keyword. For example, in the phrase "find books authored by Paul with some images illustrated by Peter," the system would group "authored by" with "Paul" and "illustrated by" with "Peter" based on how many words apart they are. Once entities and keywords have been identified and associated, a set of intents associated with the set of entity and keyword pairs is determined. In the event the set of intents associated with the sets of entity and keyword pairs comprises more than one intent, the most likely overall intent is determined using a model. The determined entities are associated with the multiple entities of the overall intent, and a response to a requestor is determined by appropriately querying a database.

The system for responding to a set of words improves the computer system by allowing compound natural language phrases to be parsed and actions taken in response. A traditional natural language processing system is only able to deal with simple phrases, constraining its usefulness for issuing commands to the computer. For instance, database queries initiated through the system for responding to a set of words are able to be significantly more complex and thus more specific compared with a traditional system. Specifically, the accuracy of response to natural language phrases improves over current typical systems.

FIG. 1 is a block diagram illustrating an embodiment of a network system. In some embodiments, the network system of FIG. 1 comprises a network system for a natural language processing system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, natural language processing system 106, and database system 108 communicate via network 100.

User system 102 comprises a user system for use by a user. A user uses a user system to interact with natural language processing system 106 or database system 108, for example to provide natural language command requests, to receive command responses, to request database data, to request database reports, to store database data, etc. In some embodiments, the network system of FIG. 1 comprises a plurality of user systems associated with one or more users. Administrator system 104 comprises an administrator system for use by an administrator. Administrator system 104 comprises an administrator system for executing administrator commands, for configuring natural language processing system 106 or database system 108, etc.

Natural language processing system 106 comprises a system for receiving a natural language formatted query and determining a response. For example, natural language processing system 106 comprises a response based at least in part on a simple or a compound phrase. In some embodiments, natural language processing system 106 comprises a system for responding to a set of words comprises an interface configured to receive the set of words, and a processor configured to determine a token from the set of words, determine an entity and an associated keyword from the token, wherein the entity is associated with an entity type, determine an intent based at least in part on the set of words, match the entity to an entity of the intent based on the associated keyword, and determine a response based on the intent and the entity.

Database system 108 comprises a database system for storing data, retrieving data, preparing reports based on data, responding to database queries, etc. For example, database system 108 receives a database query from natural language processing system 106 (e.g., a query determined from a natural language query request).

Figure 2:
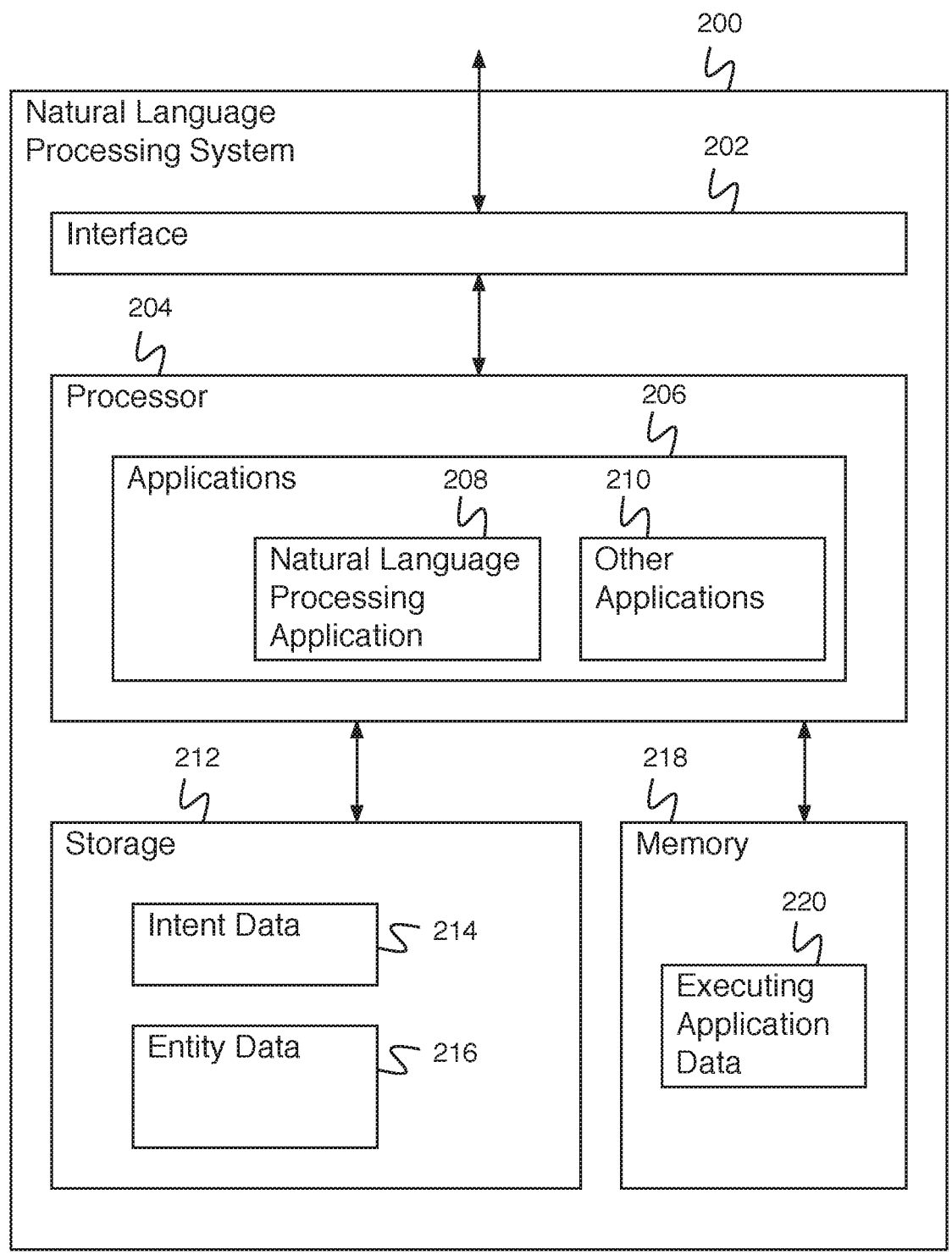
FIG. 2 is a block diagram illustrating an embodiment of a natural language processing system.

FIG. 2 is a block diagram illustrating an embodiment of a natural language processing system. In some embodiments, natural language processing system 200 of FIG. 2 comprises natural language processing system 106 of FIG. 1. In the example shown, natural language processing system 200 comprises interface 202. Interface 202 comprises an interface for communicating with external systems using a network. For example, interface 202 comprises an interface for communicating with a user system (e.g., for receiving natural language requests, for providing request responses, etc.). Processor 204 comprises a processor for executing applications 206. Applications 206 comprise natural language processing application 208 and other applications 210. For example, natural language processing application 208 receives a set of words, determines a token from the set of words, determines an entity and an associated keyword from the token, wherein the entity is associated with an entity type, determines an intent based at least in part on the set of words, matches the entity to an entity of the intent based on the associated keyword, and determines a response based on the intent and the entity.

Other applications 210 comprise any other appropriate applications (e.g., a communications application, a chat application, a web browser application, a document preparation application, a data storage and retrieval application, a user interface application, a database query application, a data analysis application, etc.). Planning system 200 additionally comprises storage 212. Storage 212 comprises intent data 214 (e.g., comprising a set of intent templates—for example, comprising one or more entity keyword pairs, an intent response, etc.) and entity data 216 (e.g., comprising a set of known entities and associated entity types). Tenant security control system 200 additionally comprises memory 218. Memory 218 comprises executing application data 220 comprising data associated with applications 206.

FIG. 3 is a diagram illustrating an embodiment of a user interface for creating an intent definition. In some embodiments, the intent definition interface 300 of 3 is used by natural language processing application 208 of FIG. 2 to define intents. In the example shown, intent definition interface 300 is being used to create an intent definition named Find Documents. For example, intent definition interface 300 comprises a user interface for intent definition. The Find Documents intent is associated with three inputs (e.g., three entities—keyword pairs). For example, each input comprises a pull down menu or a text entry field for entity type and a pull down menu or text entry field for potential keywords associated with the entity type. The first input comprises a creator input, which comprises an entity of type person associated with one of a set of keywords including "created by", "started by", or "author". The second input comprises an updater input, which comprises an entity of type person associated with one of a set of keywords including "updated by" or "last changed by". The third input comprises a modified date input, which comprises an entity of type date associated with one of a set of keywords including "updated" or "modified". In some embodiments, the intent definition is associated with a command for execution using entity values as parameters (e.g., for searching for a document created by the creator entity, updated by the updater entity, within a date range indicated by the modified date entity, etc.). For example, each input comprises an intent entity (e.g., the definition of the intent comprises a plurality of intent entities). In some embodiments, the intent defined using intent definition interface 300 comprises one of a plurality of intent entities.

In some embodiments, the natural language processing application is configured to communicate with a system to facilitate filtering data sets and resolving ambiguity using natural language. Further, the system may allow intent trainers to perform training for one or more intents. For training, each intent (such as document retrieval), the system requires a set of input entities, which may be acquired from an intent trainer selecting the required entity types (e.g., person, date, location, etc.) and entering the names (for identification purpose) and the keywords (e.g., last updated by, last edited on, born in, etc.) associated with these types. Further, input entities may be derived automatically from structured data. For example, for database systems, the types and keywords may be obtained from the database column definition (e.g., personName—text type, hiredDate—date type, age—number type, etc.). For application program interface (API), the type/keywords may be retrieved from the discovery endpoint, listed out all supported filter names as well as their types.

In some embodiments, all or some of the "Intent Inputs" fields of FIG. 3 can be reduced or removed in the event that the system connects to a Database or an API. The Database's columns or API's meta definitions provides the "Name" as well as "Entity Type", while a global thesaurus and/or synonym dictionary provides the "Keywords" For example, a Database table Book can have a column named Author. The intent "Find Books" can deduce that one of its Intent Inputs is "Author" (in addition to other columns) of type Person (since the database column has name+data type). Users can therefore say "find all books by author Peter" or "get all books written by Paul", where "written by" is the equivalent of "author" in the global Thesaurus, and these are appropriately matched to entities and keywords automatically.

In some embodiments, manual keyword entries can be further replaced and/or supplemented by a global thesaurus and/or synonym dictionary, whether generic or specific to a business domain (e.g., HR). For example, an entity name "Author" can be equated to "written by" or "authored by" automatically within a thesaurus and/or synonym dictionary.

Figure 4:
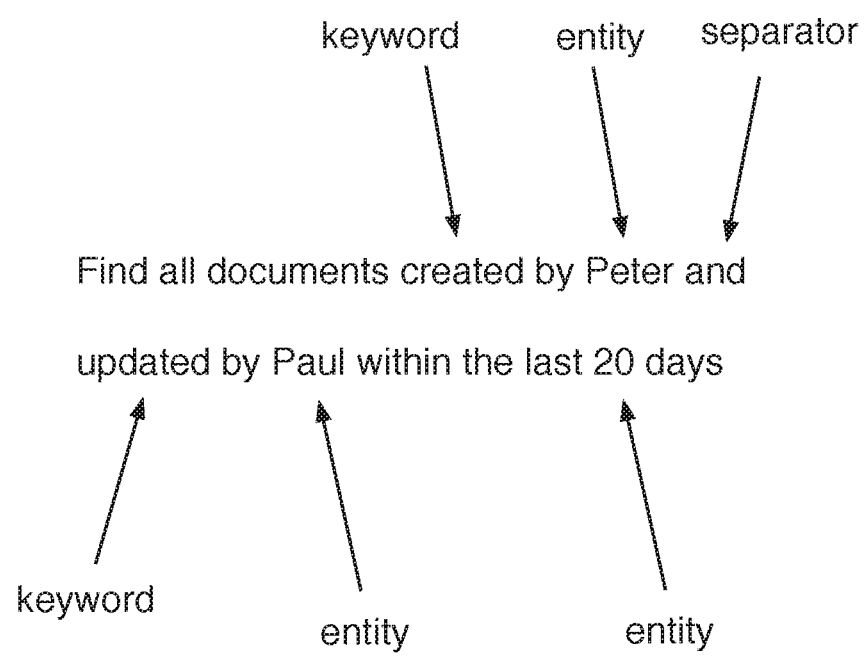
FIG. 4 is a diagram illustrating an embodiment of a set of words.

FIG. 4 is a diagram illustrating an embodiment of a set of words. In some embodiments, the set of words 400 of FIG. 4 is an input to natural language processing system 106 of FIG. 1. In the example shown, set of words 400 comprises the sentence "Find all documents created by Peter and updated by Paul within the last 20 days". Set of words 400 comprises two keywords, "created by" and "updated by", and three entities, "Peter", "Paul", and "last 20 days". Matching the keywords and entities without further sentence parsing is unlikely to be accurate. In order to parse the sentence, the separator "and" is identified prior to searching for entities and keywords. The sentence is broken into two tokens around the separator, first token "Find all documents created by Peter" and second token "updated by Paul within the last 20 days". The two tokens are then analyzed separately. The first token comprises entity "Peter" of type person and keyword "created by". The entity and keyword are associated to form an entity keyword pair. The second token comprises keyword "updated by" and entities "Paul" of type person and "last 20 days" of type date. Each entity is associated with the keyword, forming two more entity keyword pairs. The three formed entity keyword pairs (e.g., Created-Peter; Updated-Paul, and Update-Last 20 Days) are matched to an intent definition. For example, the three formed entity keyword pairs are stack ranked in terms of how well they match a defined intent. In this case, the entity keyword pairs match with the find documents intent as shown in FIG. 3.

Figure 5:
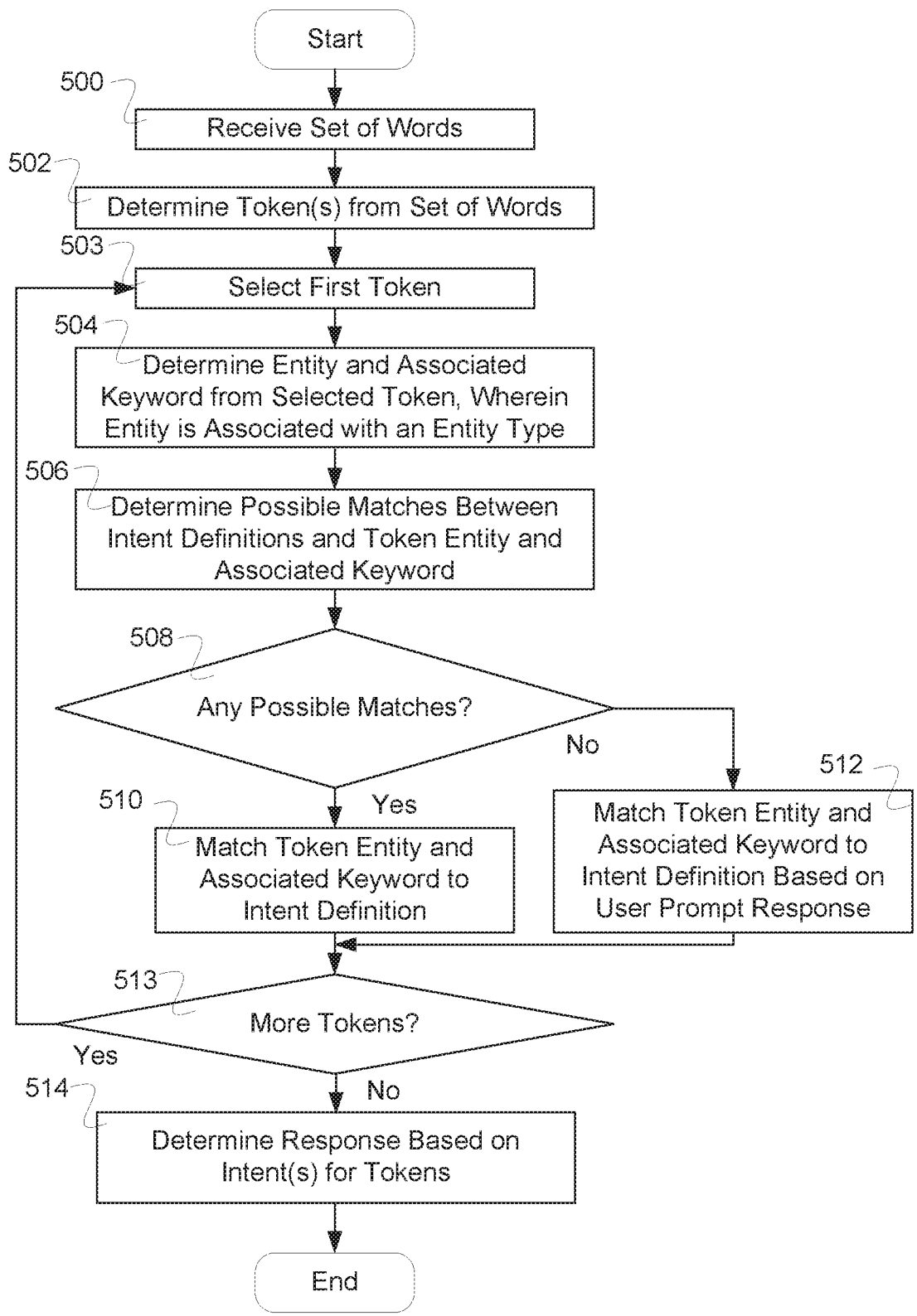
FIG. 5 is a flow diagram illustrating an embodiment of a process for responding to a set of words.

FIG. 5 is a flow diagram illustrating an embodiment of a process for responding to a set of words. In some embodiments, the process of FIG. 5 is executed by natural language processing system 106 of FIG. 1. In the example shown, in 500, a set of words is received. In 502, token(s) is/are determined from the set of words. In 503, a first token is selected. For example, one token is selected from the determined token(s). In some embodiments, the token selected is a first token. In 504, an entity and an associated keyword are determined from the selected token, wherein the entity is associated with an entity type. In 506, possible matches between intent definitions and token entity and associated keyword are determined. In 508, it is determined whether there are any possible matches. In response to determining that there are matches, control passes to 510. In 510, the token entity and associated keyword are matched to an intent definition, and control then passes to 513. For example, a model is used to match one or more intent definitions with the entity and the associated keyword. In some embodiments, a score is determined for how much a given intent definition matches the token entity and associated keyword and a top, bottom, or above threshold score are used to select as one or more matches. In response to determining in 508 that the token entity and associated keyword cannot be matched to an intent definition, control passes to 512. In 512, the token entity and associated keyword are matched to intent definition based on a user prompt response, and control then passes to 513. For example, a user is prompted to input an intent definition. In 513, it is determined whether there are more tokens. In response to there being more tokens, control passes to 503. In response to there not being more tokens, in 514, a response is determined based on the intent(s) for the tokens.

Figure 6:
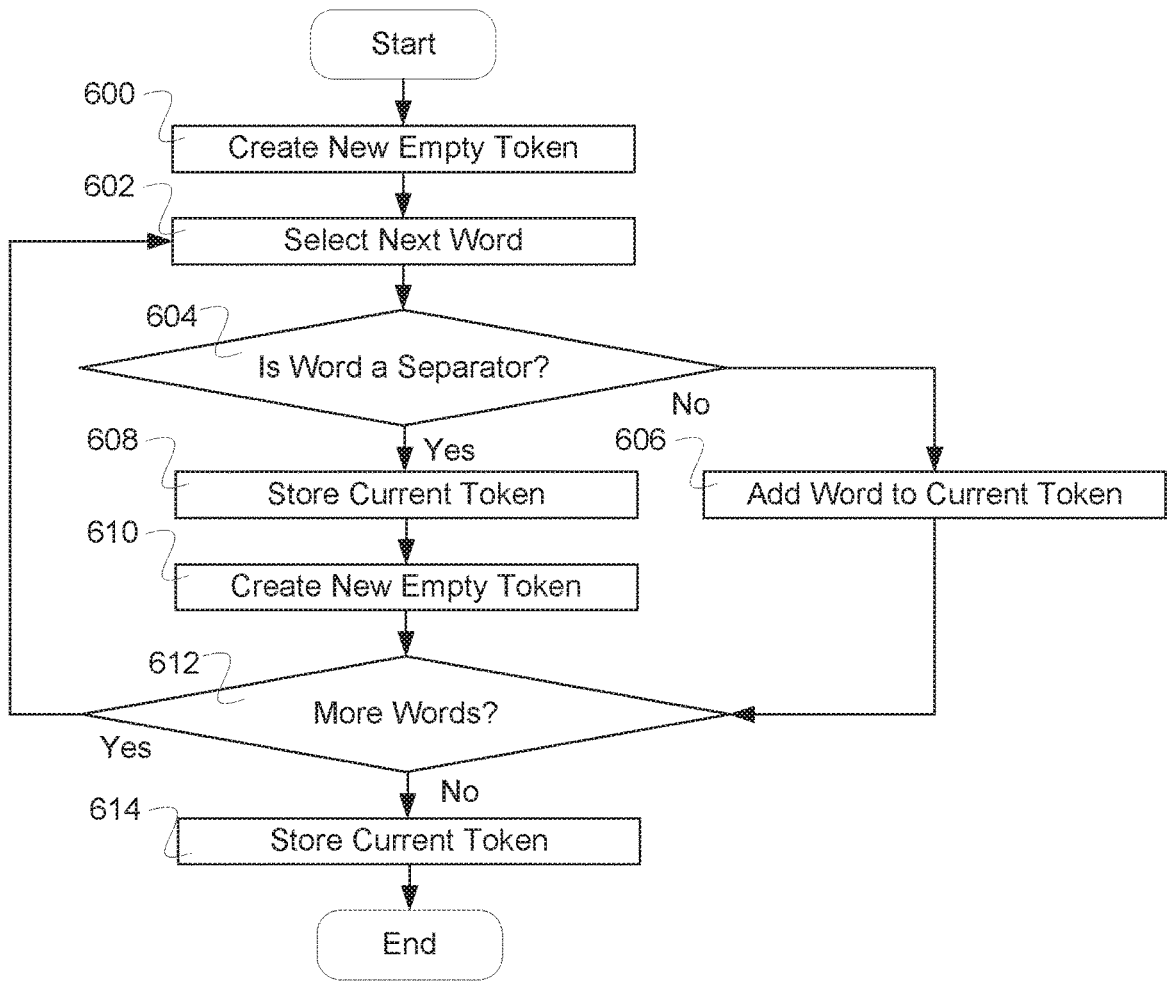
FIG. 6 is a flow diagram illustrating an embodiment of a process for determining a token from a set of words.

FIG. 6 is a flow diagram illustrating an embodiment of a process for determining a token from a set of words. In some embodiments, words of the set of words comprise punctuation marks. In some embodiments, the process of FIG. 6 implements 502 of FIG. 5. In the example shown, in 600, a new empty token is created. In 602, a next word is selected. For example, a next word of the set of words is selected. In some embodiments, the next word comprises the first word. In some embodiments, the next word comprises a punctuation mark. In 604, it is determined whether the word is a separator. For example, a separator comprises one of 'and', 'or', 'but', 'nor', 'either', 'neither', ',', ';', ':', '.', '?', or '!'. In another example, the appropriate separators are defined in another language or combination of languages as appropriate. In response to determining that the word is not a separator, control passes to 606. In 606, the word is added to the current token, and control then passes to 612. In response to determining in 604 that the word is a separator, control passes to 608. In 608, the current token is stored. In 610, a new empty token is created. In 612, it is determined whether there are more words (e.g., of the set of words). In response to determining that there are more words of the set of words, control passes to 602. In response to determining that there are not more words of the set of words, control passes to 614. In 614, the current token is stored, and the process ends.

Figure 7:
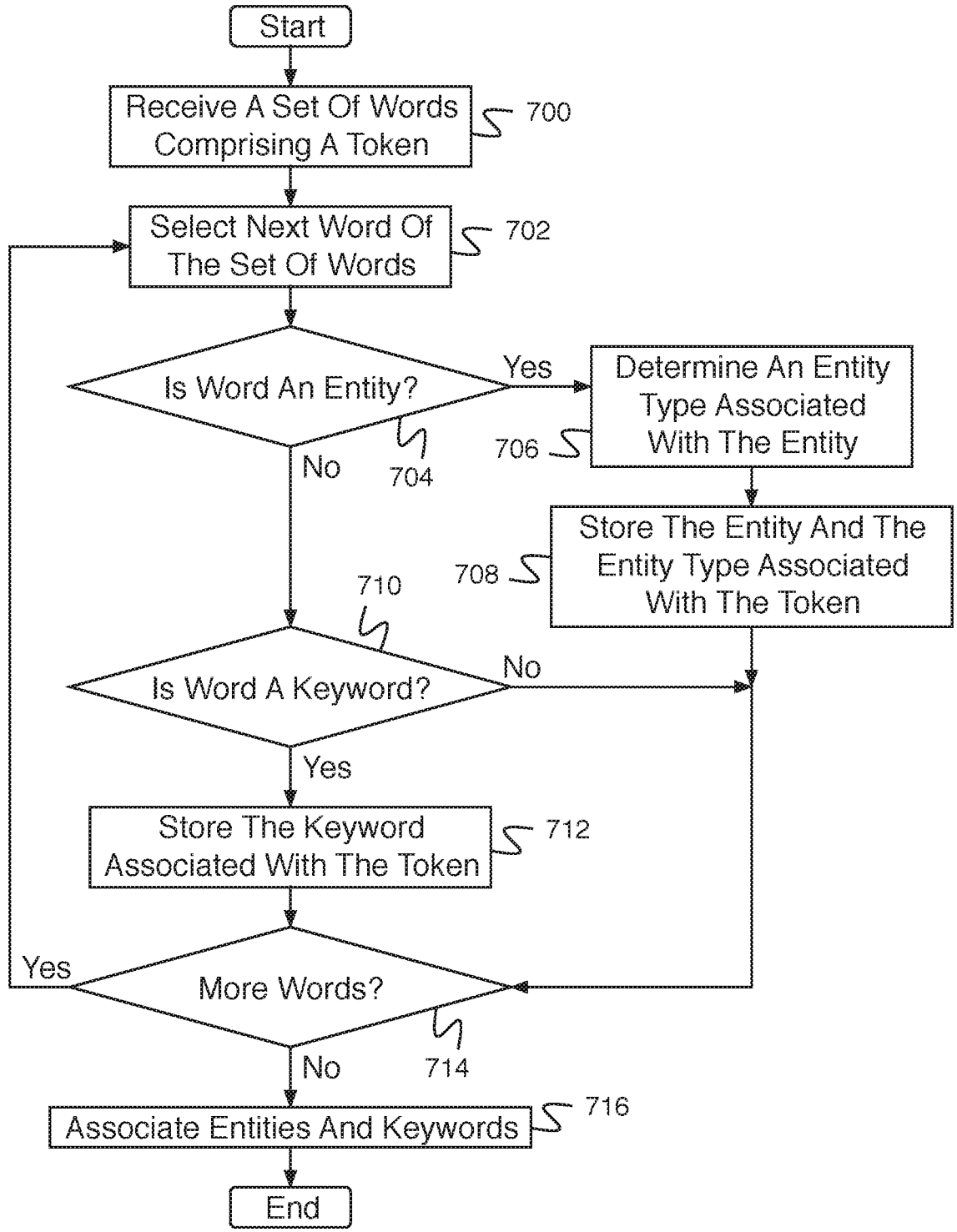
FIG. 7 is a flow diagram illustrating an embodiment of a process for determining an entity and an associated keyword from a token.

FIG. 7 is a flow diagram illustrating an embodiment of a process for determining an entity and an associated keyword from a token. In some embodiments, the process of FIG. 7 implements 504 of FIG. 5. In the example shown, in 700, a set of words comprising a token is received. In 702, a next word of the set of words is selected. In 704, it is determined whether the word is an entity. In the event it is determined that the word is an entity, control passes to 706. In 706, an entity type associated with the entity is determined. In 708, the entity and the entity type are stored associated with the token, and control then passes to 714. In response to determining in 704 that the word is not an entity, control passes to 710. In 710, it is determined whether the word is a keyword. In response to determining that the word is not a keyword, control passes to 714. In response to determining that the word is a keyword, control passes to 712. In 712, the keyword is stored associated with the token. In 714, it is determined whether there are more words. In response to determining that there are more words, control passes to 702. In response to determining that there are not more words, control passes to 716. In 716, entities and keywords are associated.

Figure 8:
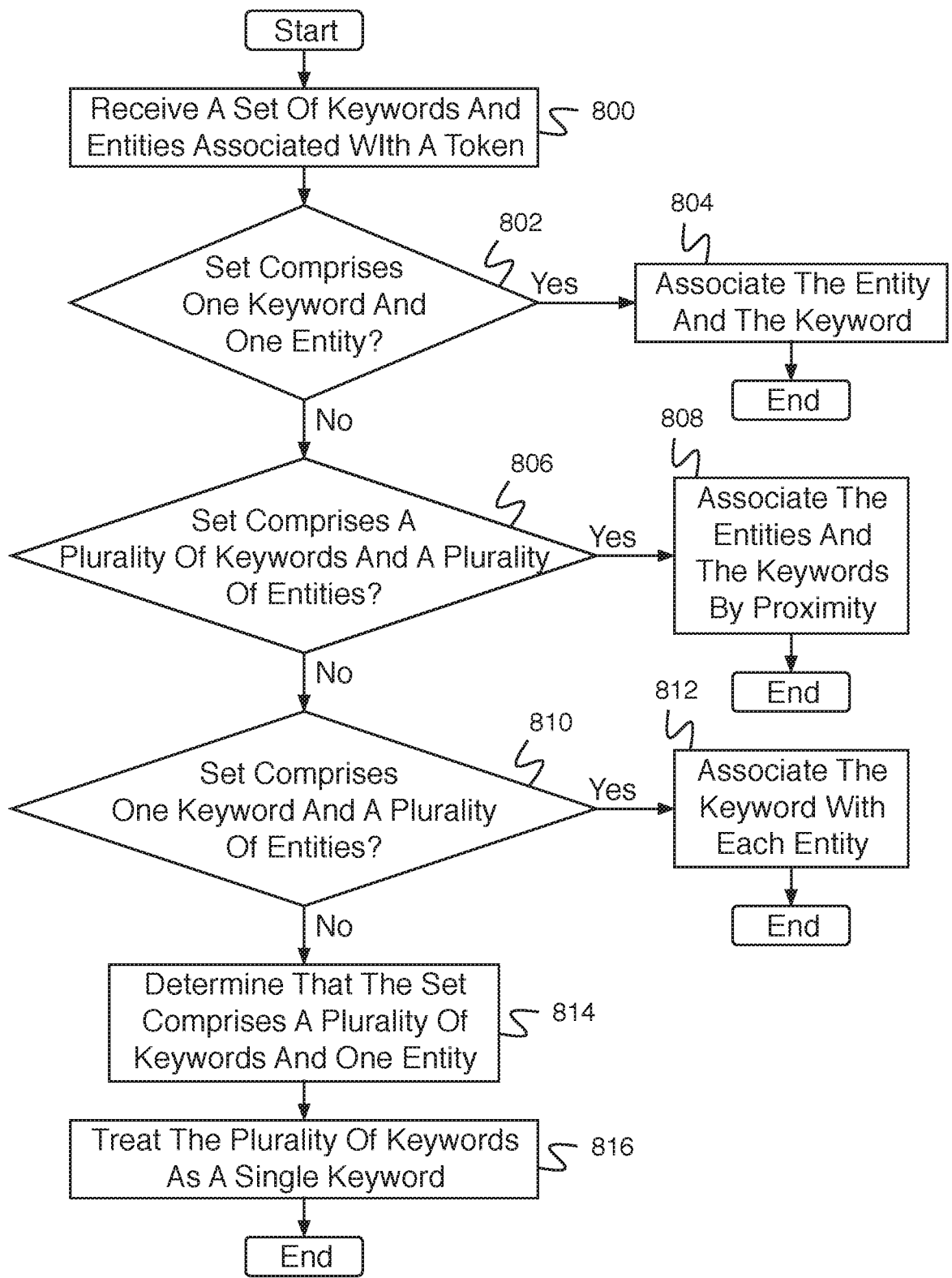
FIG. 8 is a flow diagram illustrating an embodiment of a process for associating keywords and entities.

FIG. 8 is a flow diagram illustrating an embodiment of a process for associating keywords and entities. In some embodiments, the process of FIG. 8 implements 716 of FIG. 7. In the example shown, in 800, a set of keywords and entities associated with a token is received. In 802, it is determined whether the set comprises one keyword and one entity. In response to determining that the set comprises one keyword and one entity, control passes to 804. In 804, the entity and the keyword are associated, and the process ends. In response to determining in 802 that the set does not comprise one keyword and one entity (e.g., the set comprises more than one keyword and/or more than one entity), control passes to 806. In 806, it is determined whether the set comprises a plurality of keywords and a plurality of entities. In response to determining in 806 that the set comprises a plurality of keywords and a plurality of entities, control passes to 808. In 808, the entities and the keywords are associated by proximity, and the process ends. In response to determining in 806 that the set does not comprise a plurality of keywords and a plurality of entities, control passes to 810. In 810, it is determined whether the set comprises one keyword and a plurality of entities. In response to determining that the set comprises one keyword and a plurality of entities, control passes to 812. In 812, the keyword is associated with each entity (e.g., of the plurality of entities), and the process ends. In response to determining in 810 that the set does not comprise one keyword and a plurality of entities, control passes to 814. In 814, it is determined that the set comprises a plurality of keywords and one entity. In 816, the plurality of keywords are treated as a single keyword.

Figure 9:
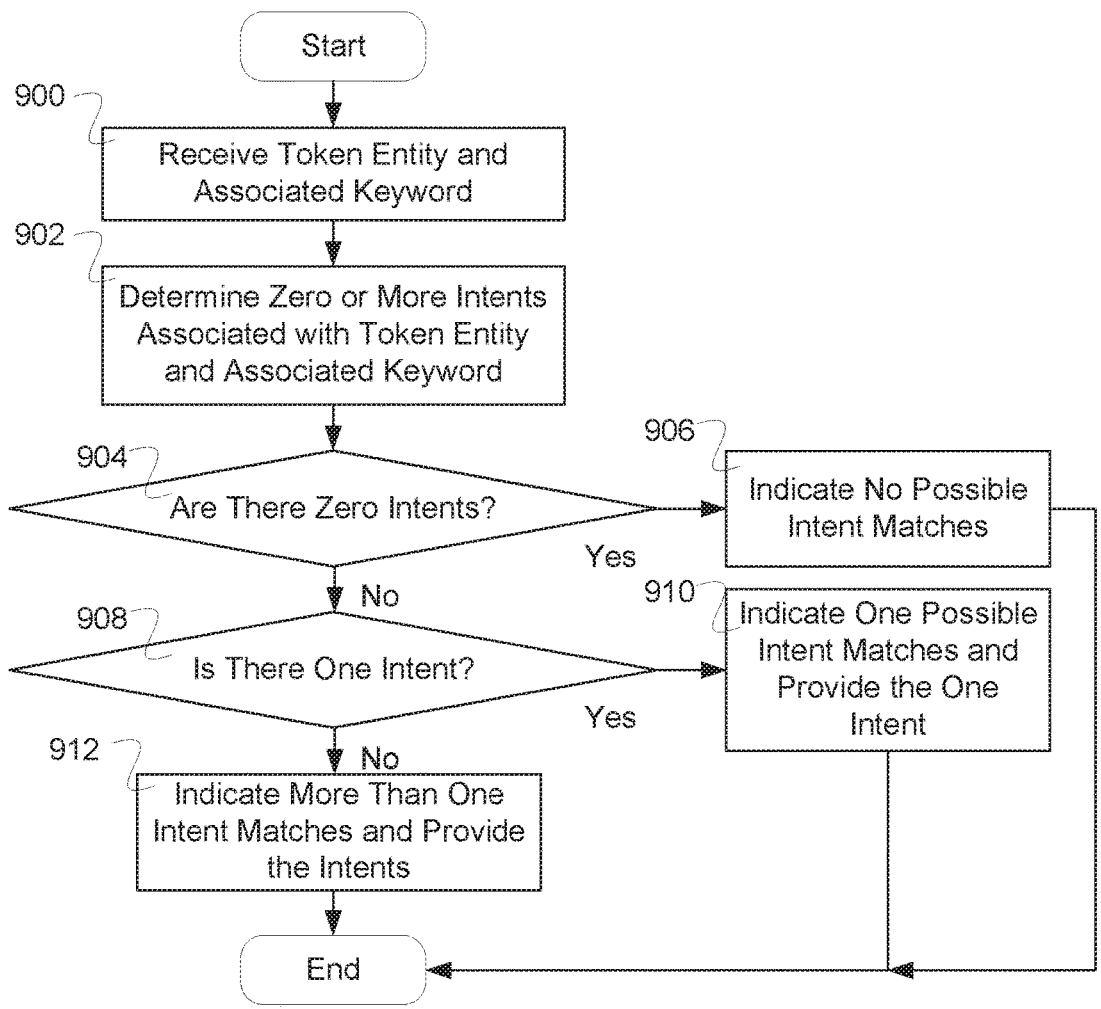
FIG. 9 is a flow diagram illustrating an embodiment of a process for determining an intent.

FIG. 9 is a flow diagram illustrating an embodiment of a process for determining an intent. In some embodiments, the process of FIG. 9 implements 506 of FIG. 5. In the example shown, in 900, a token entity and an associated keyword are received. In 902, zero or more intents associated with the set of entity keyword pairs are determined. In 904, it is determined whether there are zero intents associated with the token entity and the associated keyword. In response to determining that there are zero intents associated with the token entity and the associated keyword, in 906 it is indicated that there are no possible intent matches, and the process ends. In response to determining that there are not zero intents associated with the token entity and the associated keyword, control passes to 908. In 908, it is determined whether there is one intent associated with the token entity and the associated keyword. In response to determining that there is one intent associated with the token entity and the associated keyword, in 910 it is indicated that there is one possible intent match and the one intent is provided, and the process ends. In response to determining that there is not one intent associated with the token entity and the associated keyword, in 912 it is indicated that there are more than one intent matches and the intents are provided, and the process ends.

Figure 10:
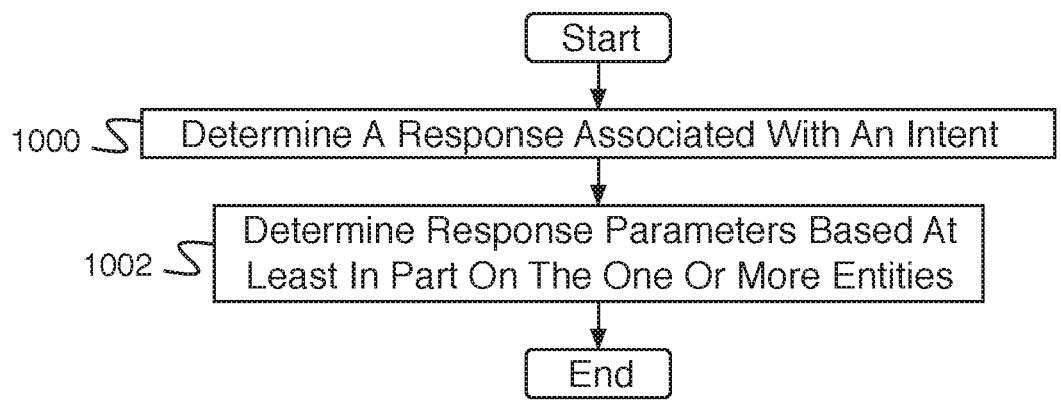
FIG. 10 is a flow diagram illustrating an embodiment of a process for determining a response.

FIG. 10 is a flow diagram illustrating an embodiment of a process for determining a response. In some embodiments, the process of FIG. 10 implements 510 of FIG. 5. In the example shown, in 1000, a response associated with an intent is determined. For example, the response comprises an indication of an action, wherein the action comprises a search, a call, a text, a photo capture, a database query, a written text response, a spoken text response, etc. In 1002, action parameters are determined based at least in part on the one or more entities.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for responding to a set of words, comprising:
 an interface configured to:
  receive the set of words; and
 a processor configured to:
  determine a token from the set of words;
  determine a set of entity keyword pairs from the token, wherein each entity keyword pair of the set of entity keyword pairs comprises an entity associated with an entity type and a keyword, wherein the keyword comprises a past participle indicating a contextual meaning associated with the entity, wherein a first entity keyword pair of the set of entity keyword pairs comprises a first entity associated with a first entity type, and wherein a second entity keyword pair of the set of entity keyword pairs comprises a second entity associated with a second entity type, the second entity type being different from the first entity type;

determine one or more intent definitions matching at least one entity keyword pair of the set of entity keyword pairs;

determine, using a model, a most likely intent definition of the one or more intent definitions, wherein the model comprises a machine learning model or a neural network model, wherein the most likely intent definition is associated with an action; and determine a response based on the most likely intent definition and the entity, wherein the response comprises an indication of the action.

2. The system of claim 1, wherein the set of words comprises an ordered set of words.

3. The system of claim 1, wherein determining the token from the set of words comprises segmenting the set of words using a separator.

4. The system of claim 3, wherein the separator is defined for the English language or another language.

5. The system of claim 4, wherein the separator for the English language comprises one of 'and', 'or', 'but', 'nor', 'either', 'neither', ',', ';', ':', '.', '?', or '!'.

6. The system of claim 1, wherein the entity type comprises one of date, location, person, address, or a user defined type.

7. The system of claim 1, wherein a keyword associated with an entity of type date comprises create date or modify date.

8. The system of claim 1, wherein a keyword associated with an entity of type person comprises creator or modifier.

9. The system of claim 1, wherein in response to a determination that the token comprises a plurality of entities and a plurality of keywords, keywords are associated with entities by proximity.

10. The system of claim 1, wherein in response to a determination that the token comprises the entity and a plurality of keywords, the plurality of keywords is treated as a single keyword.

11. The system of claim 1, wherein in response to a determination that the token comprises a plurality of entities and a keyword, the keyword is associated with each entity of the plurality of entities.

12. The system of claim 1, wherein an intent definition of the one or more intent definitions comprises a plurality of intent inputs.

13. The system of claim 1, wherein an intent definition of the one or more intent definitions comprises an intent name.

14. The system of claim 1, wherein the most likely intent definition comprises a best matching intent definition of the one or more indent definitions.

15. The system of claim 1, wherein the model is trained on sets of words mapped to defined intents.

16. The system of claim 1, further comprising a user interface for intent definition, wherein the user interface comprises a first pull down menu or a first text entry field for entity type and a second pull down menu or a second text entry field for potential keywords associated with the entity type.

17. The system of claim 1, wherein the token is one of a plurality of tokens in the set of words.

18. The system of claim 17, wherein the intent definition is determined based at least in part on one or more entities and one or more keywords determined from the plurality of tokens.

19. The system of claim 17, wherein the entity is one of a plurality of entities each from a token of the plurality of tokens.

20. The system of claim 1, wherein in response to a determination that the entity cannot be matched to the entity of the intent based on the associated keyword, the entity is matched to the entity of the intent based on a user prompt.

21. The system of claim 1, wherein the action comprises a search, a call, a text, a photo capture, or a database query.

22. The system of claim 1, wherein the response comprises a written response or a spoken text response.

23. The system of claim 1, wherein the at least one intent input comprises an input entity type and one or more input keywords.

24. The system of claim 1, wherein the entity and the keyword are associated based at least in part on a proximity of the entity and the keyword in the set of words.

25. A method for responding to a set of words, comprising:

receiving a set of words;

determining, using a processor, a token from the set of words;

determining a set of entity keyword pairs from the token, wherein each entity keyword pair of the set of entity keyword pairs comprises an entity associated with an entity type and a keyword, wherein the keyword comprises a past participle indicating a contextual meaning associated with the entity, wherein a first entity keyword pair of the set of entity keyword pairs comprises a first entity associated with a first entity type, and wherein a second entity keyword pair of the set of entity keyword pairs comprises a second entity associated with a second entity type, the second entity type being different from the first entity type;

determining one or more intent definitions matching at least one entity keyword pair of the set of entity keyword pairs;

determining, using a model, a most likely intent definition of the one or more intent definitions, wherein the model comprises a machine learning model or a neural network model, wherein the most likely intent definition is associated with an action; and determining a response based on the most likely intent definition and the entity, wherein the response comprises an indication of the action.

26. A computer program product for responding to a set of words, the computer program product being embodied in a non-transitory computer readable storage medium and comprising computer instructions for:

receiving a set of words;

determining a token from the set of words;

determining a set of entity keyword pairs from the token, wherein each entity keyword pair of the set of entity keyword pairs comprises an entity associated with an entity type and a keyword, wherein keyword comprises a past participle indicating a contextual meaning associated with the entity, wherein a first entity keyword pair of the set of entity keyword pairs comprises a first entity associated with a first entity type, and wherein a second entity keyword pair of the set of entity keyword pairs comprises a second entity associated with a second entity type, the second entity type being different from the first entity type;

determining one or more intent definitions of a plurality of intent definitions matching at least one entity keyword pair of the set of entity keyword pairs;

determining, using a model, a most likely intent definition of the one or more intent definitions, wherein the model comprises a machine learning model or a neural network model, wherein the most likely intent definition is associated with an action; and determining a response based on the most likely intent definition and the entity, wherein the response comprises an indication of the action.

\* \* \* \* \*

UNITED STATES PATENT AND TRADEMARK OFFICE
CERTIFICATE OF CORRECTION

| | | |
|---|---|---|
| PATENT NO. | : 11,520,989 B1 | Page 1 of 1 |
| APPLICATION NO. | : 16/407890 | |
| DATED | : December 6, 2022 | |
| INVENTOR(S) | : Vu Le | |

It is certified that error appears in the above-identified patent and that said Letters Patent is hereby corrected as shown below:

On the Title Page

In page 2, Column 2, item (56), U.S. patent documents, cite no. 4, delete "Kains" and insert --Kalns--, therefor.

In the Specification

In Column 1, Line(s) 12, after "purposes", insert --.--.

In the Claims

In Column 10, Line(s) 59, Claim 26, after "wherein", insert --the--.

Signed and Sealed this
First Day of August, 2023

Katherine Kelly Vidal
*Director of the United States Patent and Trademark Office*